(12) United States Patent
Holtkotte et al.

(10) Patent No.: US 6,282,875 B1
(45) Date of Patent: Sep. 4, 2001

(54) AGRICULTURAL VEHICLE AND IMPLEMENT WITH WHEELS

(75) Inventors: Eberhard Holtkotte; Rainer Schafer, both of Zweibrucken; Claus-Joseph Vogelgesang, Mandelbachtal; Richard Wubbels, Rhede, all of (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/550,838

(22) Filed: Apr. 17, 2000

(30) Foreign Application Priority Data

Apr. 23, 1999 (DE) ............................................. 199 18 551

(51) Int. Cl.⁷ .................................................. A01B 73/06
(52) U.S. Cl. ....................................................... 56/228
(58) Field of Search .................................... 56/14.4, 14.5, 56/14.6, 15.5, 16.7, 208, 228, 297, 314; 172/311, 459

(56) References Cited

U.S. PATENT DOCUMENTS

| | | | |
|---|---|---|---|
| 4,193,250 | * 3/1980 | Kessens et al. | ............................ 56/208 |
| 4,203,275 | 5/1980 | Vermeer . | |
| 4,206,582 | * 6/1980 | Molzahn et al. | ........................ 56/15.8 |
| 4,329,833 | * 5/1982 | Witzel | ....................... 56/228 |
| 4,409,780 | * 10/1983 | Beougher et al. | ...................... 56/228 |
| 4,463,546 | 8/1984 | Day . | |
| 4,715,172 | * 12/1987 | Mosby | .................... 56/228 |
| 4,903,470 | * 2/1990 | Hemker et al. | ......................... 56/228 |

FOREIGN PATENT DOCUMENTS

| | | |
|---|---|---|
| 197 26 917 A | 1/1999 | (DE) . |
| 0 386 430 B | 9/1990 | (EP) . |

\* cited by examiner

*Primary Examiner*—Robert E. Pezzuto

(57) ABSTRACT

A self-propelled forage harvester includes a main frame supported on front and rear pairs of wheels. A crop intake arrangement extends forwardly between the front wheels and releasably mounted thereto is the central component of a rowless header having right- and left-hand components pivotally attached to the central component for movement between a raised non-operative transport position for transport within a legal width and a lowered operative position wherein they extend outwardly beyond the front wheels. One of several transport wheel arrangements are selectively coupled to one or the other or both of the crop intake arrangement and the central component of the rowless header for supporting at least some of the weight of the header so that this weight is not borne by the axle of the front wheels of the forage harvester vehicle, thereby making the forage harvester legal to travel on roads where there is an axle load limit.

10 Claims, 4 Drawing Sheets

AGRICULTURAL VEHICLE AND IMPLEMENT WITH WHEELS

The present invention concerns a vehicle for application in agriculture, in particular a forage harvester or combine with an attached implement mounted on it.

BACKGROUND OF THE INVENTION

On forage harvesters, in particular, but also on combines, removable front harvesting attachments are being applied for the harvesting and recovery of crop, which are mechanically relatively costly and heavy. Such front harvesting attachments are, in particular, so-called corn pickers or corn mower-choppers. At present an ever greater effective width of the front harvesting attachments is desired for reasons of economy, in order to be able to harvest a field in shorter time and with fewer passes. A usual commercially available width is, for example, 6 m. Due to the great weight of the wider front harvesting attachments, known forage harvesters equipped with driven front wheels and steerable rear wheels that must perform at high power and therefore also exhibit great weight, in order to be able to operate together with the wide front harvesting attachments but nevertheless exceed the legally permitted axle load values on the front axle. In order to be able to apply such wide front harvesting attachments with the known two axle design, a completely new design concept would be required for a forage harvester. Similar problems can also occur with combines.

It is known to provide supporting wheels on relatively light weight pick-up devices. For example, EP-386 430-B1 reveals a crop intake arrangement for harvesting machines, a so-called pick-up with a take up drum, which is supported by wheels suspended on a full floating axle or walking beam attached by a pivotal connection; U.S. Pat. No. 4,463,546 shows a similar take up arrangement provided with support wheels, that is mounted on a combine and is used to take up grain crops previously cut and lying on the ground; and De-197 26 917-A shows a forage harvester with a pick-up also supported on wheels.

The problem underlying the invention is seen in the high axle loads of two-axle agricultural vehicles equipped with relatively wide and heavy attached implements.

SUMMARY OF THE INVENTION

The present invention relates to crop intake arrangements for harvesting machines.

An object of the invention is to provide at least one wheel for supporting the attached implement of a harvesting machine, having front and rear sets of support wheels, in order to reduce the load on the harvesting machine wheels so that, during operation over the road the danger of exceeding the maximum allowable axle loading is alleviated.

A more specific object is to provide, in conjunction with a harvesting machine attachment having a central section having foldable wing sections secured to its opposite sides, a pair of support wheels which are secured to opposite sides of the central section.

Yet another object of the invention is to provide, in accordance with another embodiment of the invention, a wheeled support that is selectively mountable between a harvesting attachment and the harvesting machine.

Still another object of the invention is to provide a harvesting machine attachment with connecting points for selectively receiving a wheeled dolly in supporting relationship to the attachment.

These and other objects of the invention will become apparent from a reading of the ensuing description together with the appended drawings.

DESCRIPTION OF THE PREFERRED EMBODIMENT

Figure 1:
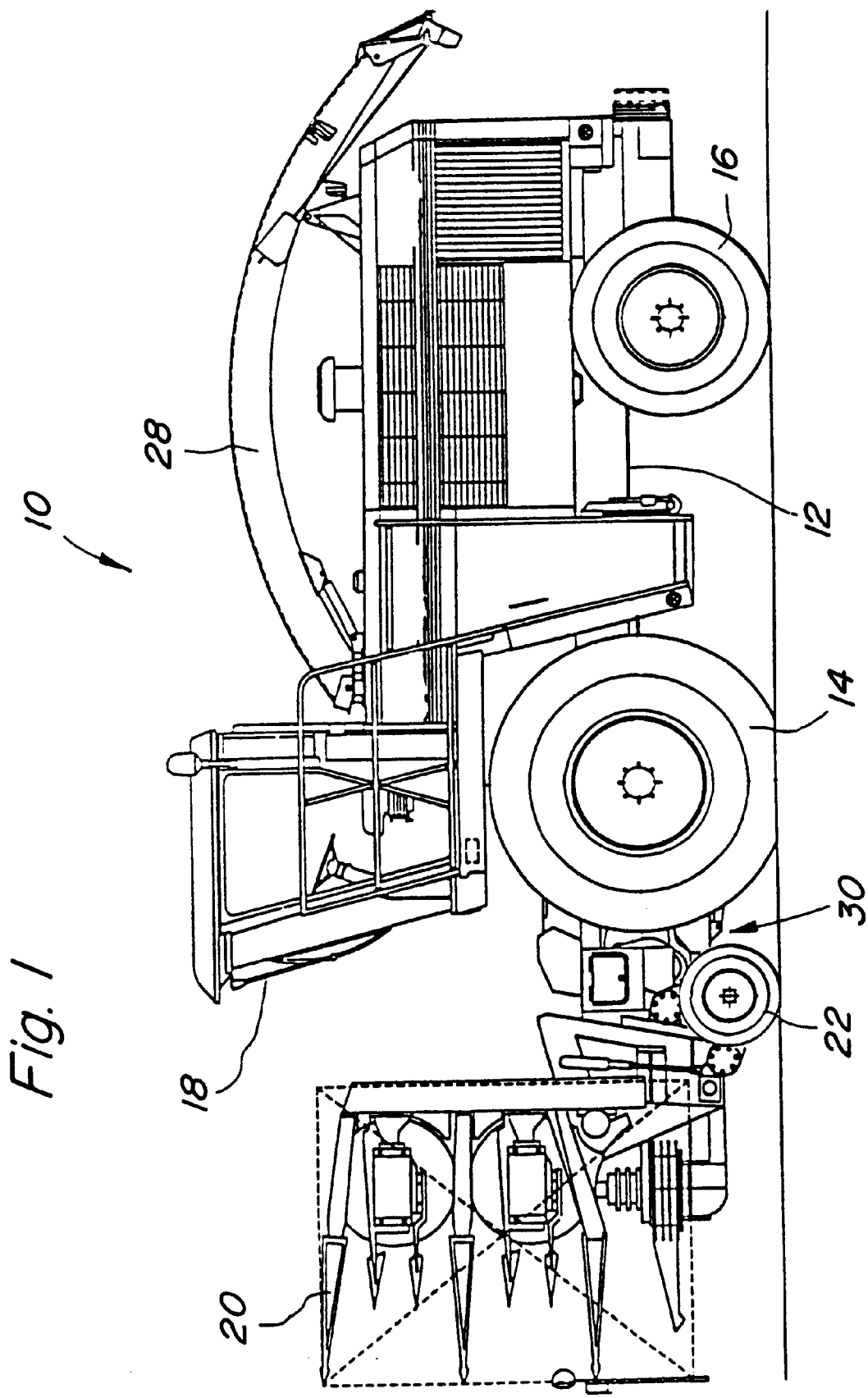
FIG. 1 shows a schematic side view of an agricultural vehicle to which a crop harvesting implement is attached.

An agricultural vehicle 10, shown in FIG. 1 in the form of a self-propelled forage harvester, is supported on a frame 12, that is carried on front and rear wheels 14 and 16, respectively. The front wheels 14 are the main driving wheels, while the rear wheels 16 can be steered. The operation of the vehicle 10 is controlled from an operator's cab 18 located at a forward end of the frame 12 and from which a front attachment 20 can be controlled while being watched by an operator seated in the cab 18. Crop, for example, corn, sunflowers or sorghum, taken up from the ground by means of the front attachment 20 is conducted over an intake assembly 30 to a chopper drum, not shown, in the interior of the vehicle 10, which chops the crop into small pieces and conducts it to a conveyor arrangement (also not shown). The crop leaves the vehicle 10 through a discharge duct 28 to an accompanying trailer. Between the chopper drum and the conveyor arrangement a post-chopper arrangement, not shown, maybe arranged. Further details of the vehicle 10 do not require description since these are known in themselves.

The crop is taken up by the attached implement 20 that is fastened to the front of the vehicle 10 as seen in the forward operating direction. The attached implement 20 of the embodiment shown is a rowless mower, known in itself, that consists of a central component to the opposite sides of which is coupled right- and left-hand side components. The side components are pivotally fastened to the central component for vertical movement. Preferably a hydraulic actuator is provided for pivoting each side component vertically between a raised position so as to narrow the attachment 20, in particular for transport on the road, and a lowered harvesting operation, wherein the side components extend parallel to the central component during the harvesting operation. The drawing shows the side components in the raised position. In the present embodiment, four intake and mower drums are arranged on the central component, while each of the side components is provided with two intake and mower drums. The attached implement 20 is equipped, as known in itself, with outer dividers, intake and mower drums divider points, cover plates and transport arrangement, that conduct components of the harvested crop to the chopper drum in the vehicle 10. The attached implement 20, configured as a mower-chopper, draws in the stems of the crop in an upright position, mows them and conducts them to the intake assembly 30 and subsequently to the chopper drum of the vehicle 10.

In the first embodiment of the invention shown in FIG. 1, two supplementary wheels 22 are fastened to either side of the intake assembly 30 of the vehicle 10 ahead of the front wheels 14, as seen in the forward operating direction. The supplementary wheels 22 are not driven and are attached so as to swivel, that is, passively steered. An active steering is conceivable, but is not provided in the present embodiment. Only one of the supplementary wheels 22 can be seen in the drawing; the second wheel is arranged coaxial to the wheel 22 shown and in the drawing the supplementary wheel 22 is covered by the intake assembly 30. The supplementary wheels 22 support the front attachment 20 and prevent the loading on the axle associated with the front wheels 14 from exceeding maximum allowable axle loading during operation over the road. Since they interfere with the downward pivoting of the side components of the attached implement 20, the supplementary wheels 22 must be brought into a non-operating position, not shown in the drawing, during harvesting operation, in which they are pivoted hydraulically upward and to the side. Of course, a more simplified mounting could be provided wherein fixtures for releasably receiving the auxiliary wheels are provided at the opposite sides of the central component of the attached implement 20

Figure 2:
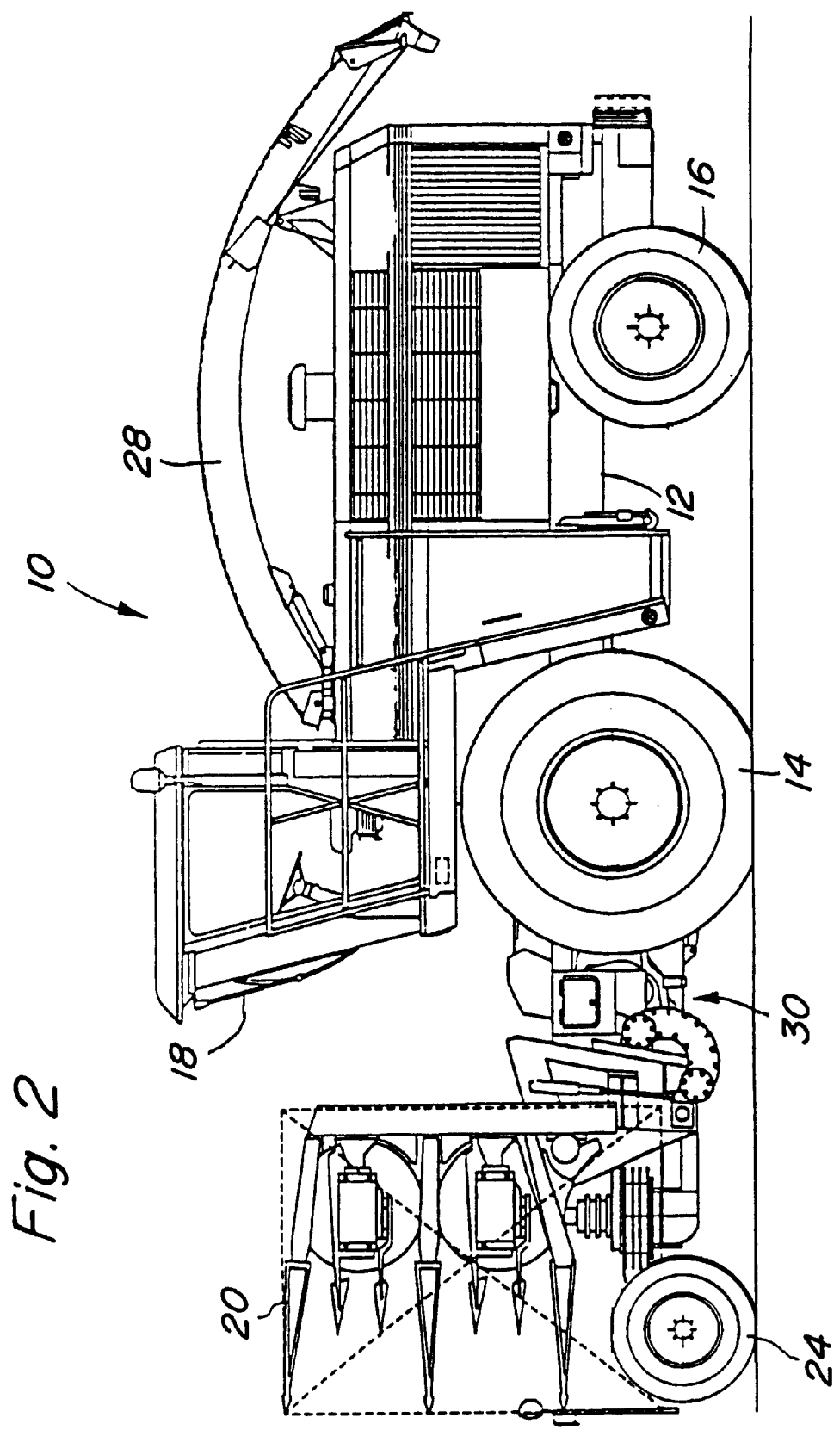
FIGS. 2, 3 and 4 respectively show a second, third and fourth embodiment of an agricultural vehicle of the type shown in FIG. 1.

FIG. 2 shows a second embodiment of the invention. In this embodiment, the supplementary wheels 24 are respectively arranged at the opposite sides of the forward end of the central component of the attached implement 20. These two supplementary wheels 24 are also for the sole purpose of supporting the attached implement 20 during operation over the road. During the harvesting operation, the supplementary wheels 24 must be removed, otherwise the side components of the attached implement 20 cannot be pivoted downward.

Figure 3:
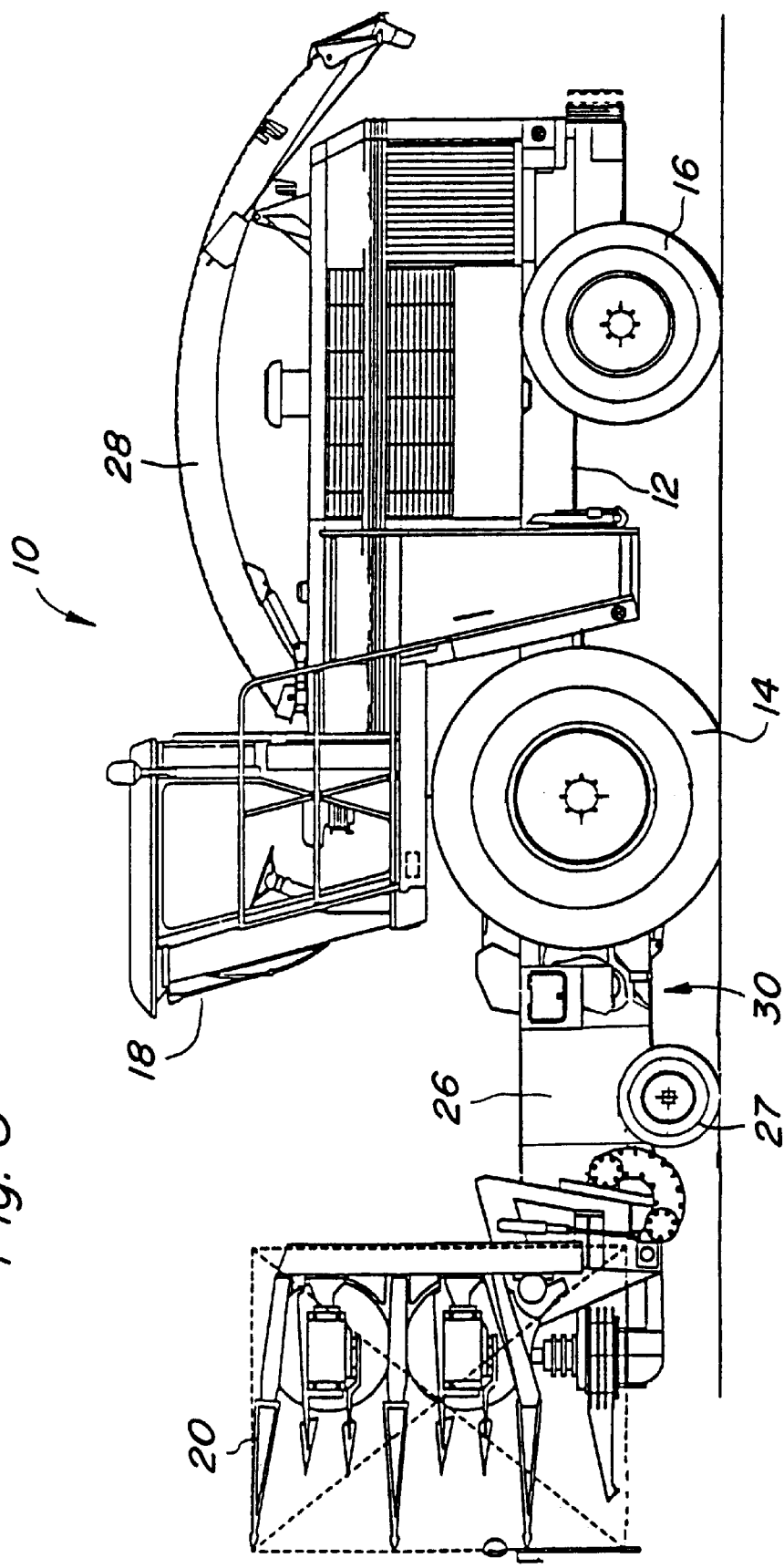

FIG. 3 shows a third embodiment of the invention. Between the vehicle 10 and the attached implement 20, an intermediate component 26 is mounted, to which supplementary wheels 27 are fastened. The intermediate component 26 is required only for operation over the road; therefore it does not need to be equipped with a channel for the crop and hence can be configured relatively simply. Front and rear faces of the component 26 are respectively provided with attachment arrangements that are similar to those provided at the front of the intake assembly 30 and at the rear of the attached implement 20.

Figure 4:
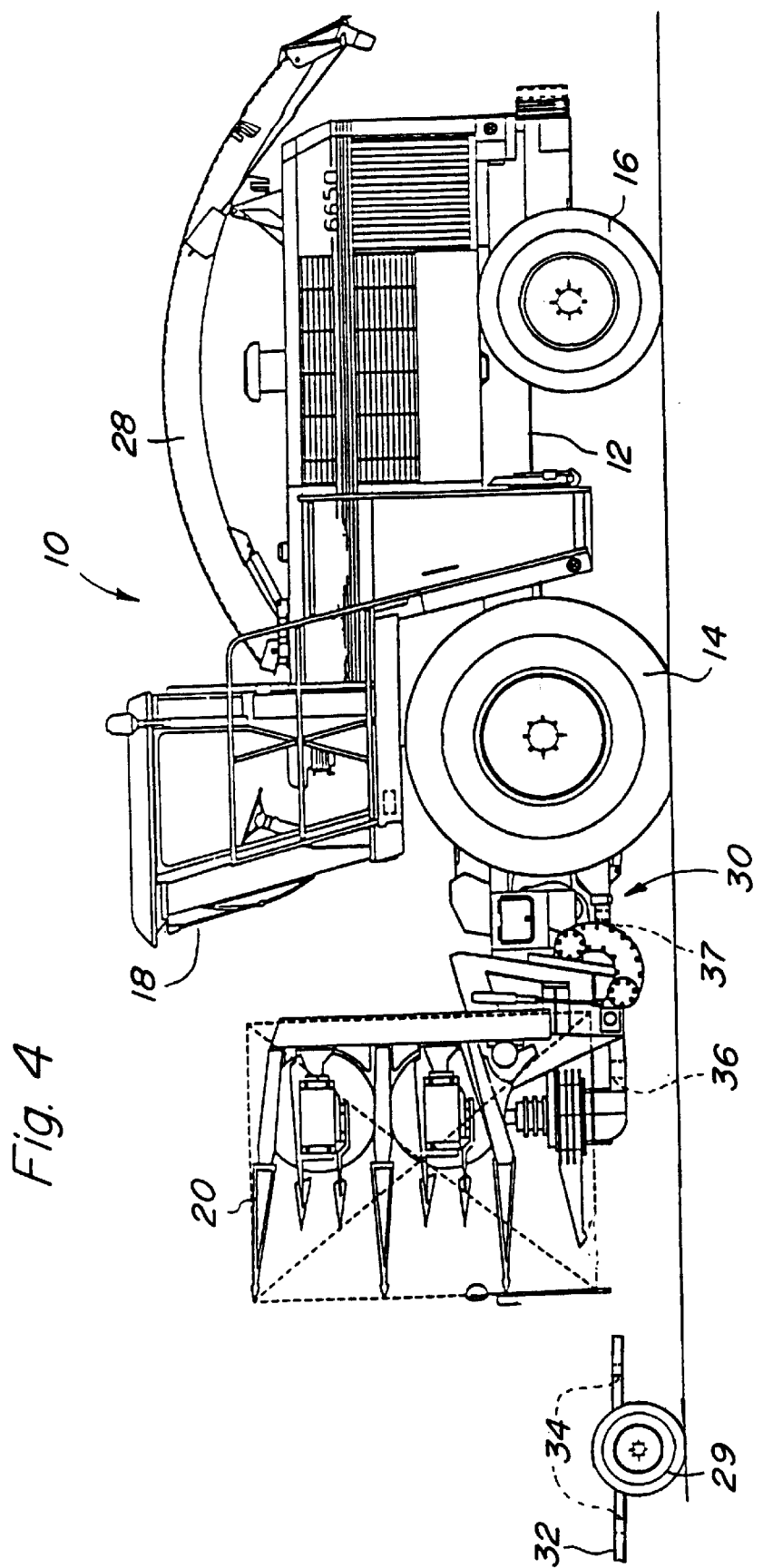

FIG. 4 shows a final and fourth embodiment of the invention. Two supplementary wheels 29 are fastened to the sides of a dolly or wagon 32 that has a flat, horizontal chassis provided with several vertical mounting holes 34. If the vehicle 10 with the attached implement 20 is to be transported over a road, the attached implement 20 is initially raised, and the wagon 32 is pushed underneath the attached implement 20. The attached implement 20 is provided with holes 36 that are complementary to front ones of the holes 34 of the wagon 32 while the crop intake arrangement 30 is provided with holes 37 that are complementary to rear ones of the hole 34 of the wagon 32 Through each set of aligned holes 34, 36, and 34, 37 pins or the like (not shown) can be inserted, as soon as the wagon 32 has been pushed into its correct position. The pins then lock the wagon 32 to the attached implement 20 and the crop intake arrangement 30, and the attached implement 20 can again be lowered, so that the supplementary wheels 24 of the wagon 32 support the attached implement 20 and reduce the load on the front wheels 14. For operation on a field, the wagon 32 is disconnected from the attached implement 20 and crop intake arrangement in reverse order. It is to be noted that the wagon or dolly 32 could be constructed for being coupled only to the central component of the attached implement 20.

What is claimed is:

1. In a self-propelled harvesting machine including a main frame supported on front and rear pairs of wheels, a crop intake arrangement being carried on said main frame, crop cutting header being releasably mounted to a forward face of said crop intake arrangement forwardly of said front wheels, and said crop cutting header including a central component to opposite sides of which right- and left-hand components are mounted for vertical pivotal movement between raised non-operating positions, wherein they are located within a width not wider than a spacing between said front wheels so as to permit the harvesting machine to be legally driven on roads, and lowered operating positions wherein they are at a level commensurate with said central component, the improvement comprising: at least one auxiliary wheel mounted to at least one of said intake arrangement and central component of said crop cutting header for supporting weight forwardly of the front wheels so as to take some of the load of the weight of said header from said front wheels when the right- and left-hand components are in their respective raised non-working positions, whereby said harvesting machine may be legally driven on roads having a limitation on axle loads.

2. The self-propelled harvesting machine, as defined in claim 1, wherein a pair of auxiliary wheels are mounted to opposite sides of said crop intake arrangement.

3. The self-propelled harvesting machine, as defined in claim 1, wherein a pair of auxiliary wheels are mounted to opposite sides of said central component.

4. The self-propelled harvesting machine, as defined in claim 1, wherein said at least one wheel is mounted to a forward location of said central component.

5. The self-propelled harvesting machine, as defined in claim 1, wherein said least one wheel is mounted to a rear location of said central component.

6. The self-propelled harvesting machine, as defined in claim 1, wherein said at least one wheel is mounted to a dolly having a chassis; and said chassis being releasably coupled to at least one of said crop intake arrangement and said central component.

7. The self-propelled harvesting machine, as defined in claim 6, wherein said chassis is substantially horizontal and contains fore-and-aft spaced mounting holes; and said central component and said crop intake arrangement respectively containing first and second sets of holes located for selective alignment with said fore-and-aft spaced mounting holes, thereby permitting said chassis to be positioned for insertion of pins through aligned ones of said mounting holes and first and second sets of holes.

8. The self-propelled harvesting machine, as defined in claim 6, wherein a pair of auxiliary wheels are respectively mounted to opposite sides of said chassis.

9. The self-propelled harvesting machine, as defined in claim 1, wherein said at least one wheel is mounted to an intermediate component; and said intermediate component being selectively mountable between said crop intake arrangement and said central component of said crop cutting header after said header is removed from said crop intake arrangement.

10. The self-propelled harvesting machine, as defined in claim 9, wherein a pair of wheels are mounted to opposite sides of said chassis.

* * * * *

UNITED STATES PATENT AND TRADEMARK OFFICE
CERTIFICATE OF CORRECTION

PATENT NO.    : 6,282,875 B1
DATED         : September 4, 2001
INVENTOR(S)   : Eberhard Holtkotte et al.

Page 1 of 1

It is certified that error appears in the above-identified patent and that said Letters Patent is hereby corrected as shown below:

<u>Column 4,</u>
Line 32, after "said" insert -- at --.

Signed and Sealed this

Twenty-fifth Day of March, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,282,875 B1
DATED : September 4, 2001
INVENTOR(S) : Eberhard Holtkotte et al.

It is certified that error appears in the above-identified patent and that said Letters Patent is hereby corrected as shown below:

<u>Title page,</u>
Item [73], Assignee, "Deere & Company, Moline, IL (US)" should be replaced with
-- Deere & Company, Moline, IL (US) and Maschinenfabrik Kemper GmbH & Co. KG, Stadtlohn, Germany --.

Signed and Sealed this

Twenty-ninth Day of July, 2003

JAMES E. ROGAN
*Director of the United States Patent and Trademark Office*